United States Patent
Ahmed et al.

(10) Patent No.: US 12,003,987 B2
(45) Date of Patent: Jun. 4, 2024

(54) DETECTION OF A SKIPPED UPLINK TRANSMISSION

(71) Applicant: Telefonaktiebolaget LM Ericsson (publ), Stockholm (SE)

(72) Inventors: Saad Naveed Ahmed, Sundbyberg (SE); Fredrik Huss, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 263 days.

(21) Appl. No.: 17/438,754

(22) PCT Filed: Mar. 11, 2019

(86) PCT No.: PCT/SE2019/050213
§ 371 (c)(1),
(2) Date: Sep. 13, 2021

(87) PCT Pub. No.: WO2020/185131
PCT Pub. Date: Sep. 17, 2020

(65) Prior Publication Data
US 2022/0159490 A1 May 19, 2022

(51) Int. Cl.
*H04W 72/542* (2023.01)
*H04W 24/08* (2009.01)

(52) U.S. Cl.
CPC ......... *H04W 24/08* (2013.01); *H04W 72/542* (2023.01)

(58) Field of Classification Search
CPC .... H04W 72/54; H04W 72/542; H04W 24/08
See application file for complete search history.

(56) References Cited

U.S. PATENT DOCUMENTS

2017/0289968 A1* 10/2017 Marco .............. H04W 72/1268
2019/0200381 A1*  6/2019 Wu ..................... H04L 1/1854
(Continued)

FOREIGN PATENT DOCUMENTS

WO    2012064781 A1    5/2012

OTHER PUBLICATIONS

Ericsson, "R2-166767: SkipUplinkTxSPS correction to enable adaptive retransmissions," Third Generation Partnership Project (3GPP), TSG-RAN WG2 #95bis, Oct. 10-14, 2016, 2 pages, Kaohsiung, Taiwan.

(Continued)

*Primary Examiner* — Kent Krueger
(74) *Attorney, Agent, or Firm* — Withrow & Terranova, PLLC

(57) ABSTRACT

The present disclosure relates to methods for operating a network node, as well as corresponding network nodes, computer programs, computer program products, and computer-readable media. The method comprises attempting to obtain a scheduled uplink transmission from a transmitter. In response to successful decoding at the network node of the scheduled uplink transmission, it is concluded that the uplink transmission is not skipped by the transmitter. In response to unsuccessful decoding at the network node of the scheduled uplink transmission and a signal strength measurement for the attempt to obtain the scheduled uplink transmission being below a threshold, it is concluded that the uplink transmission is skipped by the transmitter. In response to unsuccessful decoding at the network node of the scheduled uplink transmission and the signal strength measurement for the attempt to obtain the scheduled uplink transmission exceeding the threshold, rescheduling of the uplink transmission is performed.

15 Claims, 8 Drawing Sheets

(56) References Cited

U.S. PATENT DOCUMENTS

| | | | |
|---|---|---|---|
| 2019/0215907 A1* | 7/2019 | Phuyal | H04W 76/27 |
| 2019/0245657 A1* | 8/2019 | Lee | H04L 1/1835 |
| 2019/0320491 A1* | 10/2019 | Shukair | H04W 72/1268 |
| 2021/0281364 A1* | 9/2021 | Yeh | H04L 1/20 |

OTHER PUBLICATIONS

Huawei, et al., "R2-163915: Problem of UL DTX detection," Third Generation Partnership Project (3GPP), TSG-RAN WG2 Meeting #94, May 23-27, 2016, 2 pages, Nanjing, China.

Intel Corporation, "R2-162467: Further aspects of UL grant skipping," Third Generation Partnership Project (3GPP), TSG-RAN2 Meeting #93bis, Apr. 11-15, 2016, 5 pages, Dubrovnik, Croatia.

Nokia, et al., "R1-165140: PUSCH DTX Detection for LAA UL," Third Generation Partnership Project (3GPP), TSG RAN WG1 Meeting #85, May 23-27, 2016, 3 pages, Nanjing, China.

International Search Report and Written Opinion for International Patent Application No. PCT/SE2019/050213, mailed Nov. 21, 2019, 10 pages.

Hearing Notice for Indian Patent Application No. 202147045399, mailed Dec. 15, 2023, 2 pages.

\* cited by examiner

DETECTION OF A SKIPPED UPLINK TRANSMISSION

This application is a 35 U.S.C. § 371 national phase filing of International Application No. PCT/SE2019/050213, filed Mar. 11, 2019, the disclosure of which is incorporated herein by reference in its entirety.

TECHNICAL FIELD

The present disclosure generally relates to network nodes and methods of operating network nodes. More specifically, the present disclosure relates to detection of skipped uplink transmissions.

BACKGROUND

In cellular wireless systems, such as Long-Term Evolution (LTE) and New Radio (NR) standards in 3GPP, resources for uplink (UL) transmissions are normally scheduled by the network node (such as an eNB/gNB). This can be done dynamically, i.e. the eNB/gNB schedules the UL transmission per transmission occasion which can be a transmission time interval (TTI) or multiple TT's (TTI bundling). Alternatively, this can be done using the semi persistent scheduling (SPS) framework, so that multiple periodic occasions are granted at the same time, i.e. prior to a data transmission. Configuration of SPS includes periodicity of the grant, allocation in time and frequency and modulation and coding scheme (MCS) in subsequent SPS occasions.

SPS was enhanced in LTE rel-14 to support latency reduction of UL data transmissions. Compared to UL dynamic scheduling, SPS can do UL transmission much more quickly, since it removes the steps of sending scheduling request at the user equipment (UE) and responding with UL dynamic grant at the eNB/gNB. To further reduce latency, the periodicity is reduced to less than 10 ms, which is denoted as short-SPS.

In pre Rel-14, if the buffer is empty, then the UE needs to send a padding on the allocated resources. It is more likely that the UE might have empty data with such a low periodicity, and sending padding at every TTI introduces unnecessary interference. Consequently, the option of skipping UL data transmissions when the buffer is empty is introduced. It is called skipUplinkTxSPS for SPS grant and skipUplinkTx-Dynamic for dynamic grant.

If an uplink transmission is skipped by the UE (for example since there is no data available to transmit), then the network node will not be able to receive the transmission. In order to avoid unnecessary attempts by the network node to receive and decode skipped uplink transmissions, it would be desirable to provide a way for the network node to determine whether an uplink transmission is skipped.

SUMMARY

Embodiments of methods, network nodes, computer programs, computer program products, and non-transitory computer-readable media are provided herein for addressing one or more of the abovementioned issues.

Hence, a first aspect provides embodiments of a method of operating a network node. The method comprises attempting to obtain a scheduled uplink transmission from a transmitter. In response to successful decoding at the network node of the scheduled uplink transmission, it is concluded that the uplink transmission is not skipped by the transmitter. In response to unsuccessful decoding at the network node of the scheduled uplink transmission and a signal strength measurement for the attempt to obtain the scheduled uplink transmission being below a threshold, it is concluded that the uplink transmission is skipped by the transmitter. In response to unsuccessful decoding at the network node of the scheduled uplink transmission and the signal strength measurement for the attempt to obtain the scheduled uplink transmission exceeding the threshold, rescheduling of the uplink transmission is performed.

It will be appreciated that attempting to obtain the scheduled uplink transmission may for example comprise attempting to receive and decode the scheduled uplink transmission.

A second aspect provides embodiments of a network node. The network node is configured to attempt to obtain a scheduled uplink transmission from a transmitter. The network node is configured to, in response to successful decoding at the network node of the scheduled uplink transmission, conclude that the uplink transmission is not skipped by the transmitter. The network node is configured to, in response to unsuccessful decoding at the network node of the scheduled uplink transmission and a signal strength measurement for the attempt to obtain the scheduled uplink transmission being below a threshold, conclude that the uplink transmission is skipped by the transmitter. The network node is configured to, in response to unsuccessful decoding at the network node of the scheduled uplink transmission and the signal strength measurement for the attempt to obtain the scheduled uplink transmission exceeding the threshold, perform rescheduling of the uplink transmission.

The network node may for example be configured to perform the method as defined in any of the embodiments of the first aspect disclosed herein (that is, in the claims, the summary, the detailed description, or the drawings).

The network node may for example comprise processing circuitry and at least one memory. The at least one memory may for example contain instructions executable by the processing circuitry whereby the network node is operable to perform the method as defined in any of the embodiments of the first aspect disclosed herein.

A third aspect provides embodiments of a computer program comprising instructions which, when executed by a computer, cause the computer to perform the method of any of the embodiments of the first aspect disclosed herein.

A fourth aspect provides embodiments of a computer program product comprising a non-transitory computer-readable medium storing instructions which, when executed by a computer, cause the computer to perform the method of any of the embodiments of the first aspect disclosed herein.

A fifth aspect provides embodiments of a non-transitory computer-readable medium storing instructions which, when executed by a computer, cause the computer to perform the method of any of the embodiments of the first aspect disclosed herein.

The effects and/or advantages presented in the present disclosure for embodiments of the method according to the first aspect may also apply to corresponding embodiments of the network node according to the second aspect, the computer program according to the third aspect, the computer program product according to the fourth aspect, and the non-transitory computer-readable medium according to the fifth aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

As described above in the background section, a transmitter such as a user equipment (UE) may skip uplink transmissions. In order to avoid unnecessary attempts by a network node to receive and decode skipped uplink transmissions, it would be desirable to provide a way for the network node to determine whether an uplink transmission is skipped. An example approach for detecting whether an uplink transmission is skipped will now be described for a network node employing hybrid automatic repeat request (HARQ), a discontinuous transmission (DTX) threshold, and cyclic redundancy check (CRC).

In the present example approach, the first uplink (UL) HARQ transmission received below the DTX threshold is regarded as a skipped transmission. If the first UL HARQ transmission is decoded as CRC-OK (successful decoding) or CRC-NOK (unsuccessful decoding) it is regarded as a real PUSCH transmission (in other words, the transmission is assumed not to be skipped). However, this leads to wrong skipped transmission detection when the probability of false PUSCH detection is greater than 0. For example, if the probability of false PUSCH detection is 1%, then out of 100 transmissions below the DTX threshold, 1 will result in a false PUSCH and will be decoded as CRC-NOK. This may lead to wrong decisions in a scheduler (such as user plane control, UPC) regarding the scheduling of HARQ retransmissions, and/or UL HARQ outer-loop adjustment, and/or degradation of UL HARQ block error rate (BLER) counters. This phenomenon will be more prominent when skipUplinkTx is used in combination with Prescheduling or short-SPS features. It is difficult to achieve a very low false PUSCH detection probability (for example. much lower than 1%). It may for example require the detection threshold to be increased, thus increasing the risk of declaring DTX when there is a real transmission. It is important to accurately detect when there is a signal present, so the risk of declaring DTX when there is a real transmission should not be too high. If indeed there is a real uplink transmission, but the network node is unable to decode it, retransmission should be employed so that the network node gets another chance to decode the transmission.

As illustrated in the above example, if the network node is not able to accurately detect whether or not an uplink transmission is skipped, this may affect network performance. As described below with reference to FIGS. 1-7, there is a way to address the above-mentioned problem of false PUSCH detection, whereby the probability of wrong skipped transmission detection may be reduced.

Figure 1:
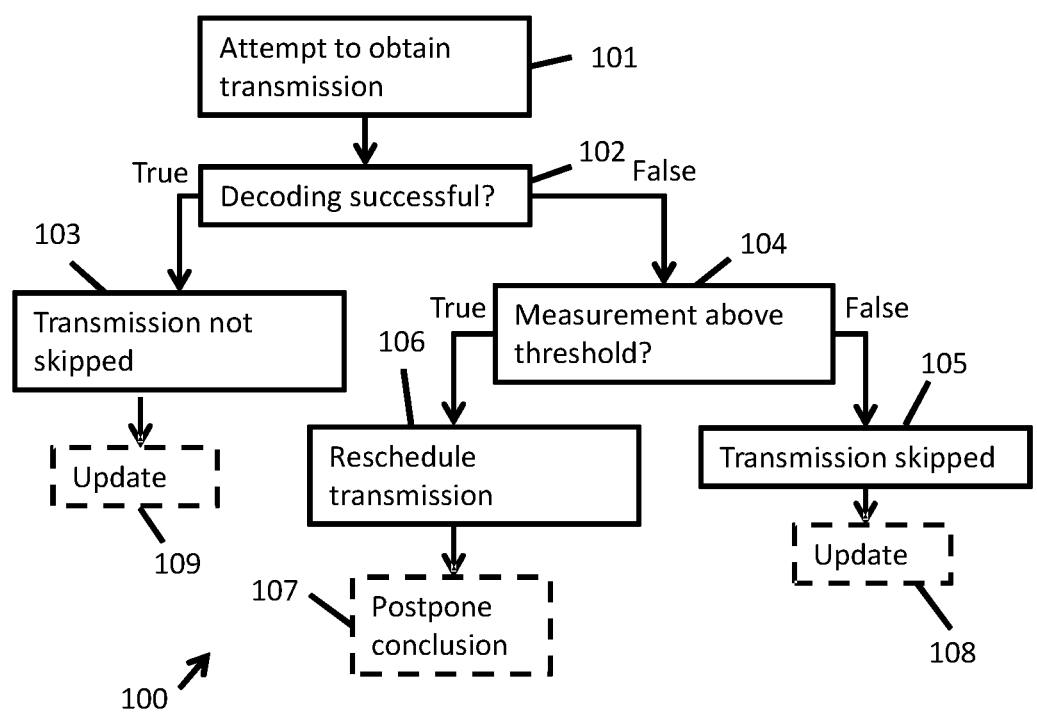
FIG. 1 is a flow chart of a method of operating a network node, in according to an embodiment.

FIG. 1 is a flow chart of a method 100 of operating a network node, in accordance with an embodiment. The network node may for example be referred to as a base station and may correspond to any type of radio network node or any network node, which communicates with a user equipment (UE) and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC) etc. Example implementations of the network node will be described further below with reference to FIGS. 5 and 8.

The method 100 comprises attempting 101 to obtain a scheduled uplink transmission from a transmitter. The attempt 101 to obtain the scheduled uplink transmission may for example comprise attempting to receive and decode the uplink transmission. The network node may for example attempt to obtain the uplink transmission from the time and/or frequency resources in which the uplink transmission is scheduled to be performed. The uplink transmission may for example be a physical uplink shared channel (PUSCH) transmission.

The transmitter is a device which is able to make uplink transmissions, for example a terminal device or a user equipment (UE). A terminal device or UE refers to any type of wireless device communicating with a network node and/or with another UE in a cellular or mobile communication system. Examples of UE are target device, device to device (D2D) UE, V2X UE, ProSe UE, machine type UE or UE capable of machine to machine (M2M) communication, PDA, iPAD, Tablet, mobile terminals, smart phone, laptop embedded equipped (LEE), laptop mounted equipment (LME), USB dongles etc. Example implementations of a terminal device or a UE will be described further below with reference to FIGS. 5 and 8.

The method 100 comprises, in response to successful decoding at the network node of the scheduled uplink transmission, concluding 103 that the uplink transmission is not skipped by the transmitter. In other words, it is checked 102 whether decoding is successful at the network node. If the decoding is successful, it is concluded 103 that the uplink transmission is not skipped by the transmitter. In other words, it is concluded that the transmitter actually transmitted the scheduled uplink transmission.

The method 100 comprises, in response to unsuccessful decoding at the network node of the scheduled uplink transmission and a signal strength measurement for the attempt to obtain the scheduled uplink transmission being below a threshold, concluding 105 that the uplink transmission is skipped by the transmitter. In other words, it is checked 102 whether decoding is successful at the network node, and it is checked 104 whether a signal strength measurement for the attempt to obtain the scheduled uplink transmission exceeds a threshold. If the decoding is unsuccessful and the signal strength measurement is below the threshold, it is concluded 105 that the uplink transmission is skipped by the transmitter. In other words, it is concluded that the transmitter did not actually transmit the scheduled uplink transmission.

Decoding of the scheduled uplink transmission could be unsuccessful even if the transmitter actually transmitted the uplink transmission. For example, interference and/or noise may cause the decoding to fail. A signal strength measurement may therefore be employed at step 104 to check whether the uplink transmission appears to be present. If the signal strength measurement is below a certain threshold (which may for example be referred to as a detection threshold) when the uplink transmission is scheduled, this may indicate that the uplink transmission was skipped by the transmitter, especially if the threshold is set low enough. The threshold may for example be set at a level where it can be concluded with a high confidence level (for example 95%, or 99%, or 99,9%) that the transmission has been skipped if the signal strength measurement is below the threshold. However, lowering the detection threshold comes with a price that the probability of falsely detecting uplink transmissions also increases.

The signal strength measurement employed at step 104 may for example be a signal-to-interference-plus-noise ratio, SINR. In other words, SINR may be measured or estimated when attempting to obtain the scheduled uplink transmission. A low SINR indicates that the scheduled uplink transmission is skipped by the transmitter.

The signal strength measurement employed at step 104 may for example be a signal power. In other words, a signal power may be measured or estimated when attempting to obtain the scheduled uplink transmission. A low signal power may indicate that the scheduled uplink transmission is skipped by the transmitter.

The method 100 comprises, in response to unsuccessful decoding at the network node of the scheduled uplink transmission and the signal strength measurement for the attempt to obtain the scheduled uplink transmission exceeding the threshold, performing 106 rescheduling of the uplink transmission. In other words, if the decoding is unsuccessful and the signal strength measurement exceeds the threshold, rescheduling of the uplink transmission is performed 106, so that a new attempt to obtain (for example to receive and decode) the uplink transmission may be made by the network node. At the step 106, the uplink transmission may be rescheduled to be retransmitted at a later point in time.

As described above, decoding of the scheduled uplink transmission could be unsuccessful even if the transmitter actually transmitted the uplink transmission. If the signal strength measurement at step 104 exceeds the threshold when the uplink transmission is scheduled, this may indicate that the uplink transmission was not skipped, despite the fact that decoding was unsuccessful. However, there is a risk that the uplink transmission was indeed skipped by the transmitter, despite the fact that the signal strength measurement appears to exceed the threshold. It may therefore be difficult to make a reliable conclusion at this stage regarding whether or not the uplink transmission was skipped by the transmitter.

The method 100 allows the network node to conclude whether or not the uplink transmission is skipped by the transmitter, and if the situation is still uncertain so that a reliable conclusion is difficult to make, further investigation may be performed using a rescheduled version of the uplink transmission. This increases the reliability of the detection of skipped uplink transmission compared to the example approach described at the beginning of the detailed description section. As described above, a more reliable detection of skipped uplink transmissions may improve network performance.

The method 100 may for example be employed in a context where identical versions of new transmission and retransmission are used. For example, a fixed redundancy version transmission scheme (such as fixedRV-NonAdaptive) may be employed to help to recover uplink transmissions.

According to some embodiments, a conclusion regarding whether or not the uplink transmission is skipped by the transmitter may be postponed 107 or delayed if the decoding of the uplink transmission is unsuccessful and the signal strength measurement employed at step 104 exceeds the threshold. In other words, since it is still uncertain whether or not the uplink transmission is skipped by the transmitter, the conclusion may be postponed (or delayed) 107 rather than making a too uncertain conclusion. The conclusion may for example be postponed or delayed at least until an attempt to obtain a rescheduled version of the uplink transmission has been made by the network node.

According to some embodiments, the method 100 comprises updating 108 an outer loop link adaptation adjustment and/or a block error rate (BLER) counter, in response to concluding 105 that the uplink transmission is skipped by the transmitter. If it can be concluded that the uplink transmission is skipped, then it can be deduced that failed decoding attempts (if any) are caused by the fact that the uplink transmission was not present, rather than other factors such as noise or interference. This may be taken into account when updating parameters such as an outer loop link adaptation adjustment and/or a BLER counter. For example, the network node may employ the criterion that an unsuccessful decoding caused by a skipped uplink transmission should not affect the BLER counter or the outer loop link adaptation adjustment or the measured uplink channel quality attributes e.g. received power used for uplink link adaptation.

According to some embodiments, the method 100 comprises updating 109 an outer loop link adaptation adjustment and/or a BLER counter, in response to concluding 103 that the uplink transmission is not skipped by the transmitter. If it can be concluded that the uplink transmission is not skipped, then it can be deduced that failed decoding attempts (if any) are probably caused by other factors such as noise or interference, whereby parameters such as an outer loop link adaptation adjustment and/or a BLER counter should be updated accordingly.

According to some embodiments, the uplink transmission comprises redundant information (for example one or more redundant bits) employed for checking 102 whether or not the decoding of the uplink transmission at the network node is successful.

According to some embodiments, the determination 102 regarding whether decoding at the network node of the scheduled uplink transmission is successful or unsuccessful is performed using a cyclic redundancy check (CRC) and/or a parity check.

According to some embodiments, the method 100 comprises, in response to a conclusion whether or not the uplink transmission is skipped by the transmitter, signaling the conclusion to a scheduler. In other words, if it has been concluded 103 that the transmission is not skipped, or if it has been concluded 105 that the transmission is skipped, such conclusions are signaled to a scheduler. The scheduler may for example be comprised in the network node. The scheduler may for example be a medium access control (MAC) scheduler. The scheduler may for example perform scheduling of one or more uplink transmissions based on the signaled conclusion.

According to some embodiments, the method 100 comprises checking whether skipping of uplink transmissions is enabled. The ability of the transmitter to skip uplink transmissions may be possible to enable or disable. If the ability to skip uplink transmissions is not enabled, then the network node knows that the scheduled uplink transmission cannot be skipped. If, on the other hand, the ability to skip uplink transmissions is enabled, the network node needs to determine whether or not the scheduled uplink transmission is skipped by the transmitter.

Figure 2:
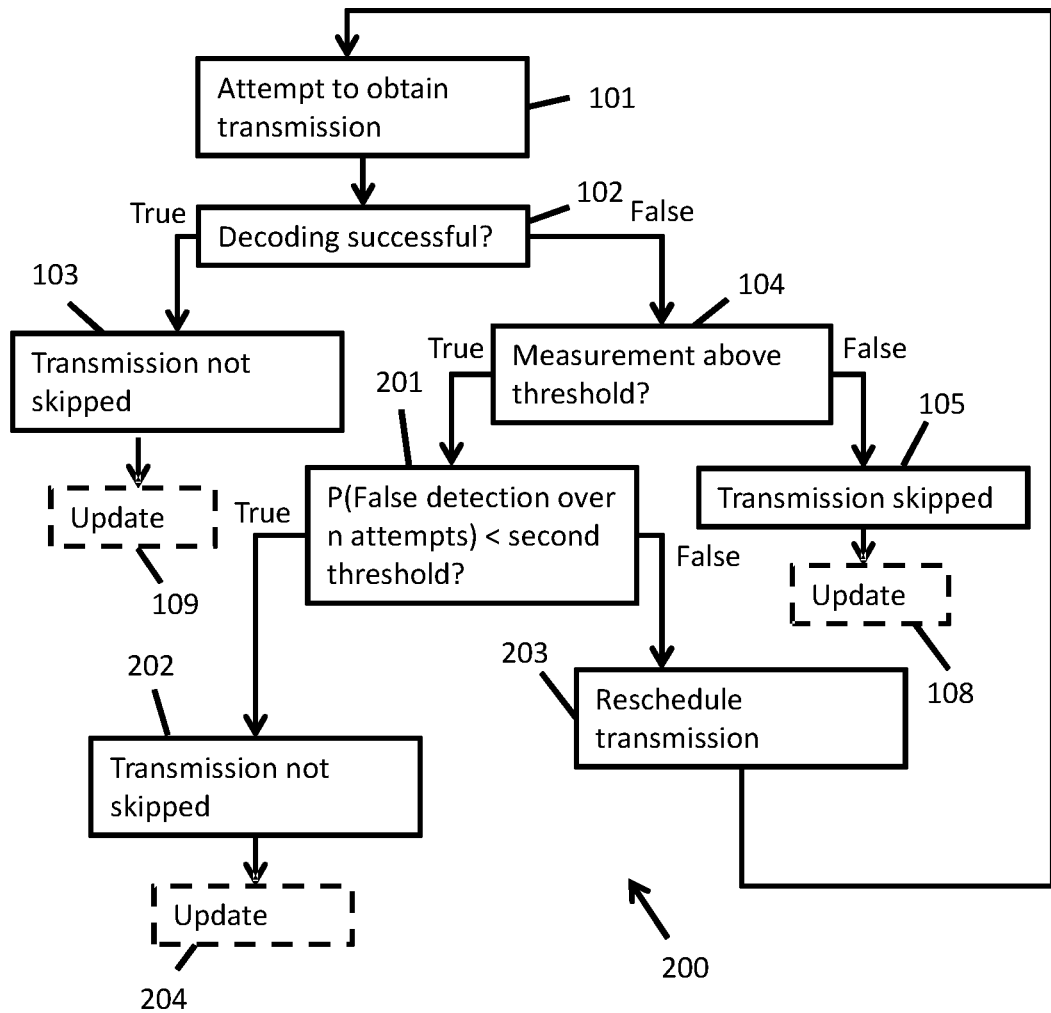
FIG. 2 is a flow chart of a method of operating a network node, wherein a probability is estimated for concluding that an uplink transmission is not skipped, according to an embodiment.

FIG. 2 is a flow chart of a method 200 of operating a network node, wherein a probability is estimated 201 for concluding that an uplink transmission is not skipped, according to an embodiment. The method 200 includes the steps 101-105 from the method 100 described above with reference to FIG. 1, so these steps will not be described again here. Optionally, the method 200 may also comprise the steps 108 and 109 from the method 100. Those steps will not be described again here.

In the method 200, the steps 101-106 may be repeated for a rescheduled version of the uplink transmission. In other words, if a conclusion regarding whether the uplink transmission is skipped by the transmitter has not yet been reached, the uplink transmission may be rescheduled 203 and an attempt to obtain 101 (for example an attempt to receive and decode) the rescheduled version of the uplink transmission may be made. In other words, the network node will look for the uplink transmission in the time and/or frequency resources in which the uplink transmission has been rescheduled to be transmitted. The steps 102 and 104 may be repeated for the rescheduled version of the uplink transmission, for determining whether or not the uplink transmission is skipped. This procedure may be repeated over and over for new rescheduled versions of the uplink transmission, if a conclusion has not yet been reached regarding whether or not the uplink transmission is skipped by the transmitter. In other words, if the steps 102 and 104 indicate that decoding of the rescheduled uplink transmission is unsuccessful and the signal strength measurement for the rescheduled uplink transmission exceeds the threshold, then the uplink transmission may be rescheduled 203 again (unless a maximum number of transmission attempts has been reached). The same threshold could for example be employed in the step 104 for the scheduled uplink transmission, as well as all rescheduled versions of the uplink transmissions. In other words, a single threshold could be employed for the signal strength measurements at the step 104 for all the transmission attempts. However, embodiments may also be envisaged in which different thresholds are employed at the step 104 for one or more of the rescheduled versions of the uplink transmissions. For example, minor variations in the threshold employed at the step 104 will typically not affect network performance.

Rather than repeating this process (steps 101, 102, 104, and 203) an unlimited number of times until a conclusion can be made regarding whether or not the uplink transmission is skipped, a stop criterion 201 is employed in the method 200. Hence, for an n:th rescheduling of the uplink transmission, wherein n≥1, the method 200 comprises, in response to unsuccessful decoding at the network node of the n:th rescheduled version of the uplink transmission and a signal strength measurement for the attempt to obtain the n:th rescheduled version of the uplink transmission exceeding a threshold, concluding 202 that the uplink transmission is not skipped by the transmitter. Here, the number n is less than a maximum number of transmission attempts (such as a maximum number of HARQ transmission attempts).

The stop criterion 201 in the method 200 is based on a probability. If decoding at the network node of the n:th rescheduled version of the uplink transmission is unsuccessful and the signal strength measurement for the attempt to obtain the n:th rescheduled version of the uplink transmission exceeds the threshold, then a probability is estimated 201. The probability estimated at step 201 is the probability that the uplink transmission is skipped by the transmitter despite the signal strength measurement for the attempt to obtain the scheduled transmission of the uplink transmission exceeding the threshold in step 104 (which is referred to as false detection of the transmission) and despite, for each integer m in the range 1≤m≤n, a corresponding signal strength measurement for an attempt to obtain an m:th rescheduled version of the uplink transmission exceeding the threshold in step 104 (in other words, false detection of the m:th rescheduled version of the uplink transmission). In other words, the probability estimated at step 201 indicates how likely it is that the uplink transmission is skipped by the transmitter despite the fact that the signal strength measurement has exceeded the threshold in step 104 so many as n+1 times in a row (in other words, n+1 false detections in a row). As described above, the same threshold could be employed in the step 104 for the scheduled uplink transmission, as well as all rescheduled versions of the uplink transmissions. However, embodiments may also be envisaged in which different thresholds are employed at step 104 for the scheduled uplink transmission and for the respective rescheduled versions of the uplink transmissions. If the probability of a false detection is known (or assumed) to be P, then the probability of n+1 false detections in a row may be computed (or estimated) as $P^{(n+1)}$.

The method 200 comprises, in response to the probability estimated at step 201 being below a second threshold, concluding 202 that the uplink transmission is not skipped by the transmitter. The probability estimated at step 201 decreases as n increases. Hence, the probability estimated as step 201 will eventually drop below the second threshold. The threshold employed at step 201 may for example be set to a low number (such as 0.01%) so that we can conclude 202 with a high confidence level (such as 99.99%) that the uplink transmission is not skipped by the transmitter.

Assume for example that the probability that the signal strength measurement is above the threshold at step 104 while the uplink transmission is skipped (in other words, the probability of false detection) is 1% for each attempt to obtain 101 an uplink transmission. If the probability is the same for each retransmission attempt, then the probability estimated at the step 201 will be 1% the first time, 0.01% the second time, and 0,0001% the third time. The threshold employed at step 201 could be set more or less as low as desired, at the cost of having to wait longer for a conclusion regarding whether or not the uplink transmission is skipped.

According to some embodiments, if it has been concluded 202 that the transmission is not skipped, this conclusion may for example be signaled to a scheduler. The scheduler may for example be comprised in the network node. The scheduler may for example be a medium access control (MAC) scheduler. The scheduler may for example perform scheduling of one or more uplink transmissions based on the signaled conclusion. The scheduler may for example reschedule the uplink transmission to give the network node a new chance to decode the transmission.

According to some embodiments, the method 200 comprises updating 204 an outer loop link adaptation adjustment and/or a BLER counter, in response to concluding 202 that the uplink transmission is not skipped by the transmitter. If it can be concluded that the uplink transmission is not skipped, then it can be deduced that failed decoding attempts (if any) are probably caused by other factors such as noise or interference, whereby parameters such as an outer loop link adaptation adjustment and/or a BLER counter should be updated accordingly.

According to some embodiments, the rescheduled versions of the uplink transmission referred to the method 200 may be HARQ retransmissions.

Figure 3:
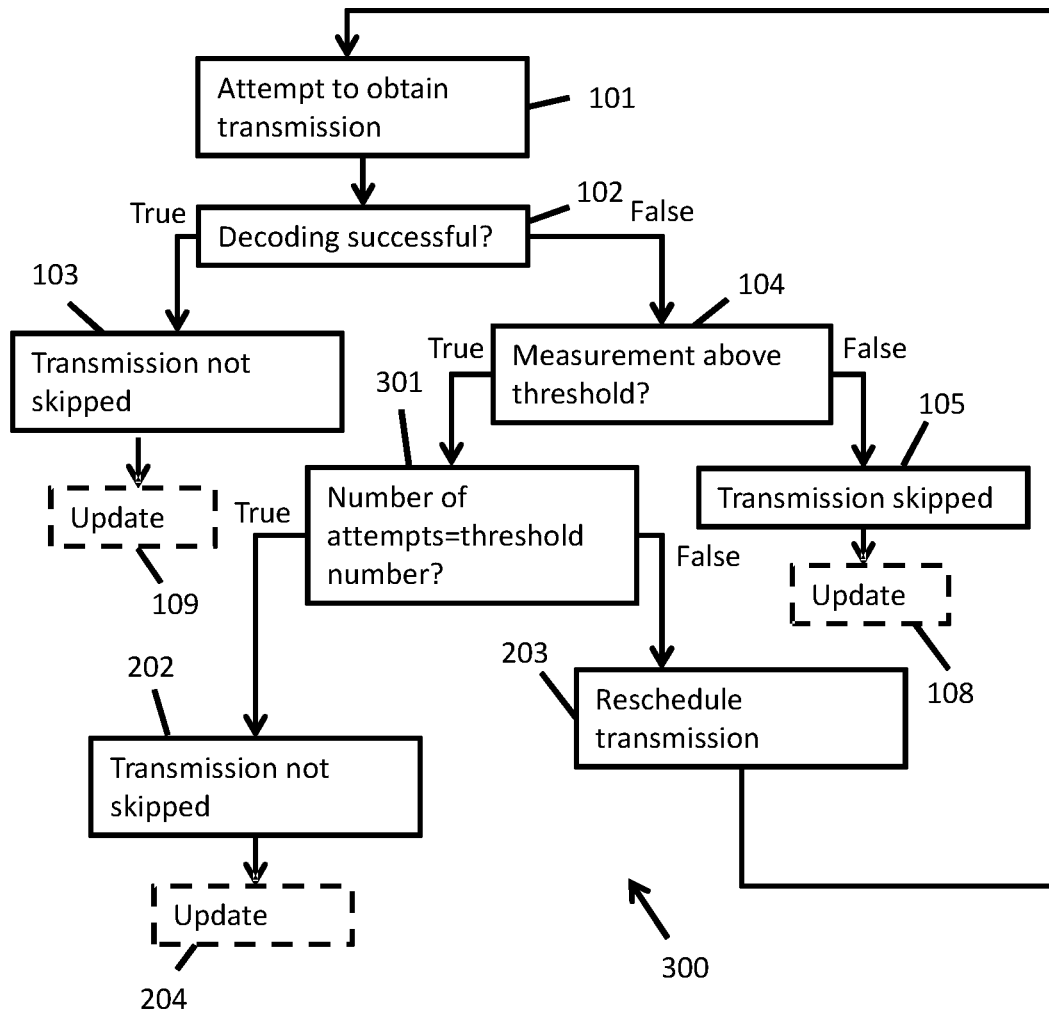
FIG. 3 is a flow chart of a method of operating a network node, wherein an threshold number for the number of rescheduling attempts is employed for concluding that an uplink transmission is not skipped, according to an embodiment.

FIG. 3 is a flow chart of a method 300 of operating a network node, wherein a threshold number for the number of rescheduling attempts is employed 301 for concluding that an uplink transmission is not skipped, according to an embodiment. The method 300 is analogous to the method 200 described above with reference to FIG. 2, except that the stoppage criterion 301 in the method 300 is different from the stoppage criterion 201 in the method 200.

If the probability estimated at step 201 in the method 200 is known a priori, or if it can be estimated in advance, then there is no need to perform the estimation at the step 201. Instead, one could simply compute in advance how many rescheduling attempts that should be allowed before concluding 202 that the uplink transmission is not skipped. In other words, a threshold number for the rescheduling attempts is employed in the method 300.

Hence, if decoding at the network node of the n:th rescheduled version of the uplink transmission is unsuccessful and the signal strength measurement for the attempt to obtain the n:th rescheduled version of the uplink transmission exceeds the threshold at step 104, then it is checked 301 whether the number n of times that the uplink transmission has been rescheduled has reached a threshold number (in other words, whether it has reached a certain number of rescheduling attempts). If the threshold number has been reached, it is concluded 202 that the uplink transmission is not skipped by the transmitter. The number n of times that the uplink transmission has been rescheduled may for example be monitored via a counter.

It will be appreciated that the threshold number employed at step 301 is not necessarily an upper limit for how many transmission attempts that can be made. If it has been concluded at step 202 that the uplink transmission is not skipped, further transmission attempts may for example be made to give the network node more chances to decode the uplink transmission. In other words, the number n referred to in the method 300 may be less than a maximum number of transmission attempts (such as a maximum number of HARQ transmission attempts).

Figure 4:
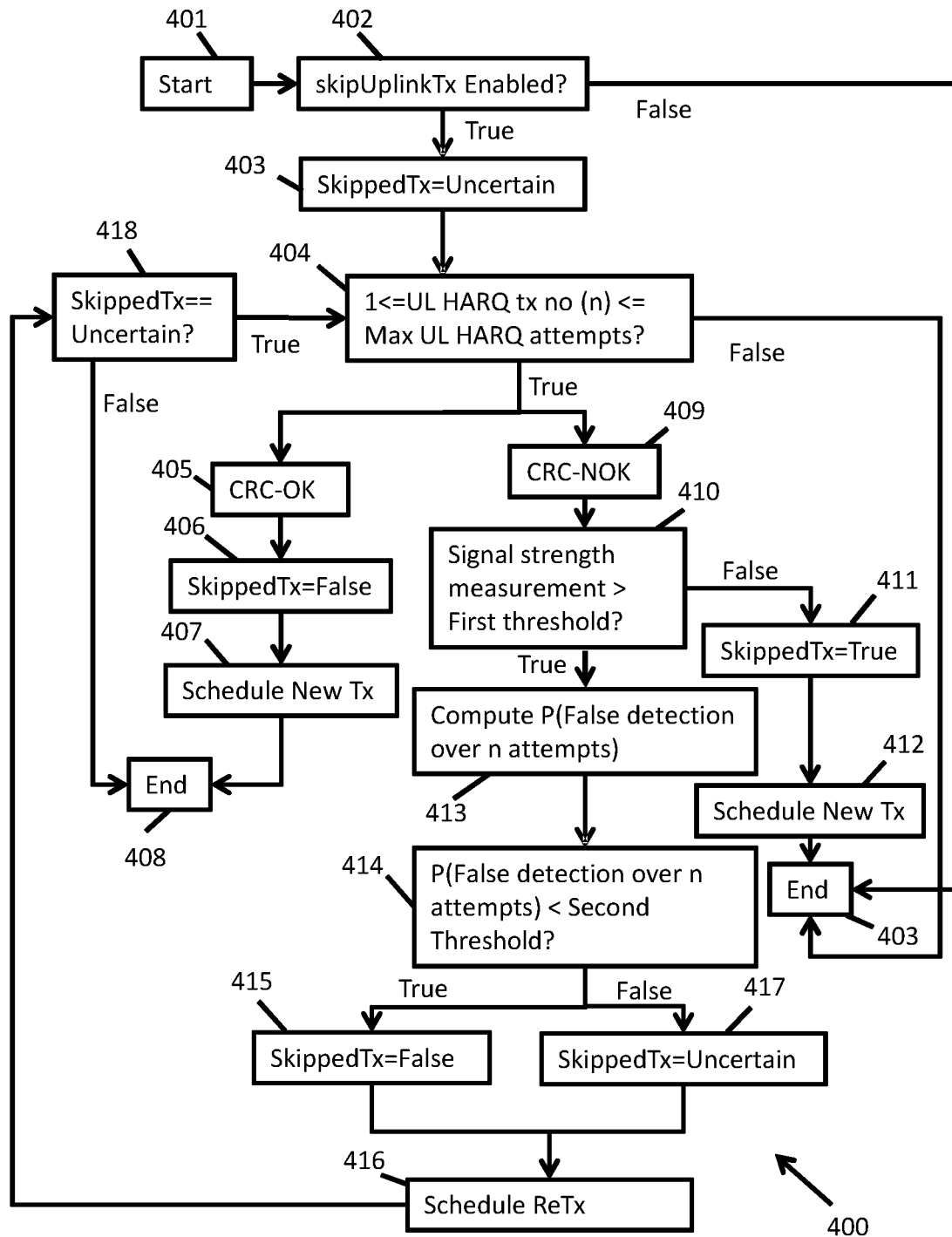
FIG. 4 is a flow chart of a more detailed method of operating a network node, according to an embodiment.
Figure 5:
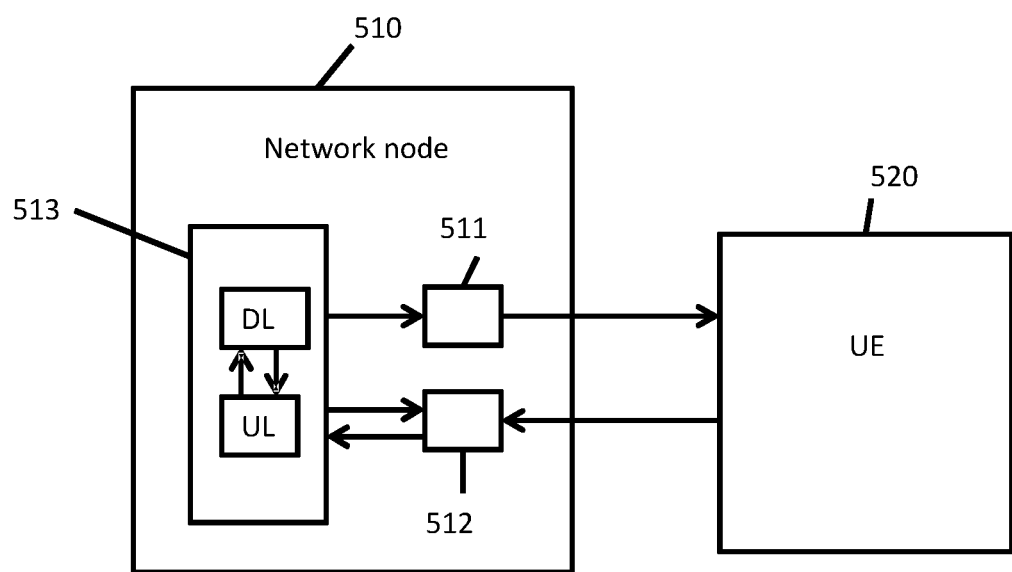
FIG. 5 shows an overview of a network node in communication with a user equipment, according to an embodiment.

FIG. 4 is a flow chart of a more detailed method 400 of operating a network node compared to the methods 100, 200 and 300, according to an embodiment. The method 400 will be described with reference to FIG. 5, which shows an example network node 510 in communication with a transmitter 520 which is exemplified herein as a UE. The example network node 510 comprises a downlink (DL) transmitter 511 and an uplink (UL) receiver 512 for communicating with the UE 520. The network node 510 also comprises a scheduler 513 for scheduling transmissions. In the present example implementation, hybrid automatic repeat request (HARQ), a discontinuous transmission (DTX) threshold, and cyclic redundancy check (CRC) are employed.

In the following exemplary description of the method 400, the uplink physical layer processing in the network node (for example an eNB) is implemented in UL L1 512 and the MAC scheduler 513 for uplink is implemented in UL user plane control (UPC). In the proposed solution, the network node UL L1 512 reports decoding results for UL transmissions to UL UPC 513. The UL UPC 513 checks the UL HARQ transmission number and decoding results and weather skipUplinkTx (SPS or Dynamic) is enabled.

The method 400 starts at 401.

The network node 510 checks 402 whether skipUplinkTx is enabled. In other words, the network node 510 checks 402 whether uplink transmissions can be skipped by the UE 520.

If skipUplinkTx is not enabled, the method 400 ends 403.

If skipUplinkTx is enabled, the skipped UL transmission decision is initialized 403 to ambiguous/uncertain.

It is checked 404 whether a maximum number of HARQ attempts has been reached. The maximum number of HARQ attempts at step 404 in the method 400 should not be confused with the threshold number employed at step 301 in the method 300. The maximum number of HARQ attempts at step 404 in the method 400 is the maximum number of HARQ attempts available for trying to decode a transmission, while the threshold number employed at step 301 in the method 300 is employed for concluding that a transmission is not skipped (and is typically lower than the maximum number of HARQ attempts).

If the maximum number of HARQ attempts has been reached, the method 400 ends 403 and SkippedTx remains uncertain. On HARQ attempt no. N, where N is greater than or equal to 1, and does not exceed the maximum number of HARQ attempts, the following steps are performed:

If the decoding result is CRC-OK (successful decoding) 405, then it can be concluded 406 that the UE didn't skip transmission. A new transmission is scheduled 407 and the method 400 ends 408.

If the decoding result is CRC-NOK (unsuccessful decoding) 409, it is checked 410 whether a signal strength measurement exceeds a first threshold (for example by checking that a signal-to-interference-plus-noise ratio (SINR) exceeds the DTX Threshold).

If the signal strength measurement does not exceed the first threshold (for example DTX is detected, in other words the SINR does not exceed the DTX Threshold), it is concluded 411 that the UE skipped transmission. A new transmission is scheduled 412 and the method 400 ends 403.

If the decoding result is CRC-NOK and the signal strength measurement exceeds the first threshold (which corresponds to not detecting DTX, in other words the SINR exceeds the DTX Threshold), then the following is performed:

Compute 413 or estimate the probability of false PUSCH detection over the number N of transmission attempts as:

Probability (false PUSCH detection over N attempts)=
Probability (false PUSCH detected on 1st attempt)×
Probability (false PUSCH detected on 2nd attempt)× . . . ×Probability (false PUSCH detected on Nth attempt).

It is then checked 414 whether Probability (false PUSCH detection over N attempts) is less than a configurable second threshold value.

If Probability (false PUSCH detection over N attempts) is less than the configurable second threshold value, then it is concluded 415 that the UE didn't skip UL transmission. A retransmission is then scheduled 416.

If Probability (false PUSCH detection over N attempts) is not less than the configurable second threshold value, it is still uncertain whether the UE skipped the uplink transmission. SkippedTx then still remains ambiguous/uncertain 417. A retransmission is scheduled 416 also in this case.

If SkippedTX remains uncertain 418, then the method 400 returns to step 404 for the next HARQ attempt. Otherwise, the method 400 ends 408.

The above steps are continued until a conclusion about skipped UL transmission is reached, or until a maximum number of HARQ attempts is reached at the step 404.

It will be appreciated that the method 400 described above with reference to FIG. 4 is employed for concluding whether the uplink transmission was skipped by the UE, and that "End" at steps 403 and 408 does not necessarily mean that the network node stops other activities, such a making further HARQ retransmission attempts after concluding that the UE has not skipped the uplink transmission.

The method 400 in FIG. 4 may be regarded as a more detailed implementation of the method 100 in FIG. 1 or of the method 200 in FIG. 2. The method 300 in FIG. 3, on the other hand, employs a different stop criterion 301 than the stop criterion 414 in the method 400 in FIG. 4. It will be appreciated that the stop criterion 301 from the method 300 could be employed in the method 400 instead of the steps 413 and 414.

Figure 6:
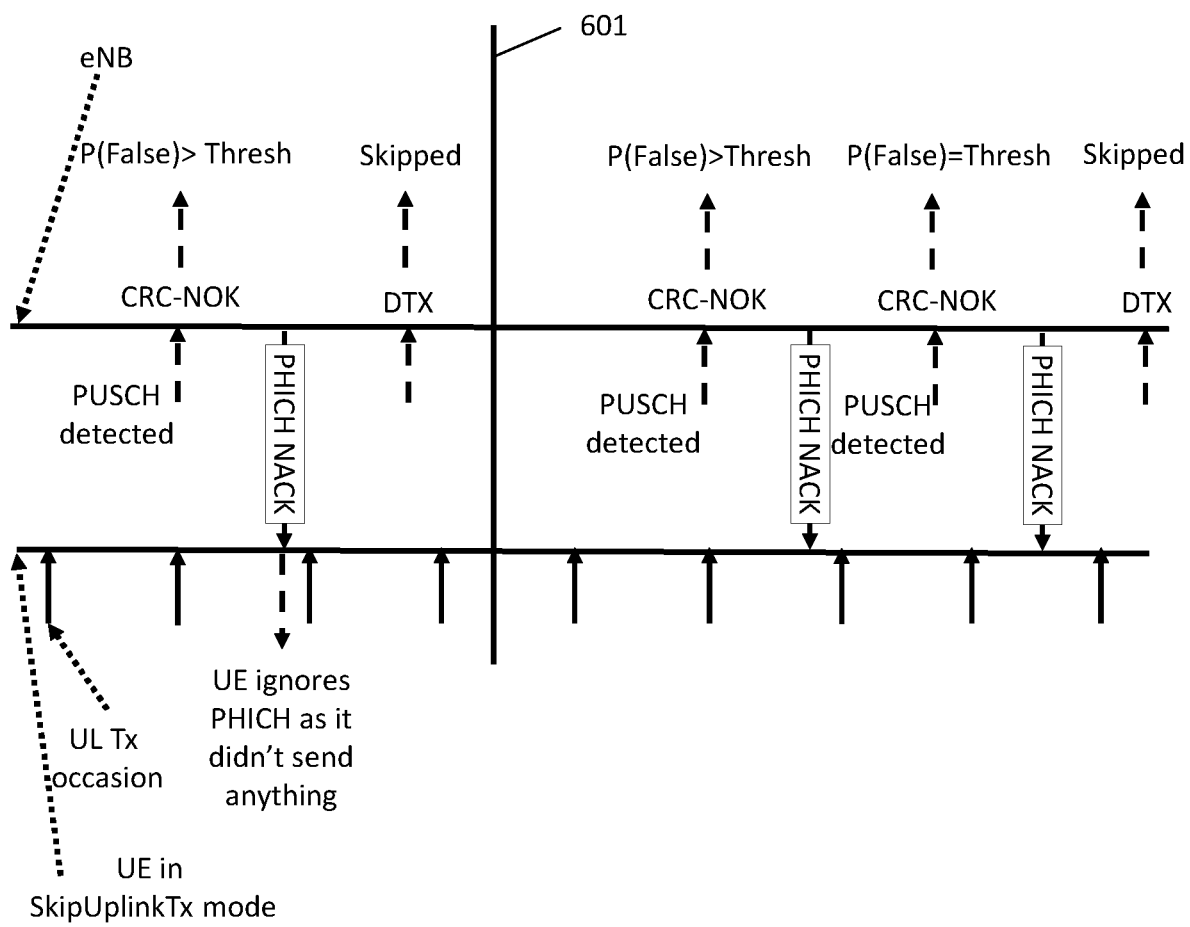
FIG. 6 shows example signaling between a network node and a user equipment (UE) when an uplink transmission is skipped by the UE, according to an embodiment.
Figure 7:
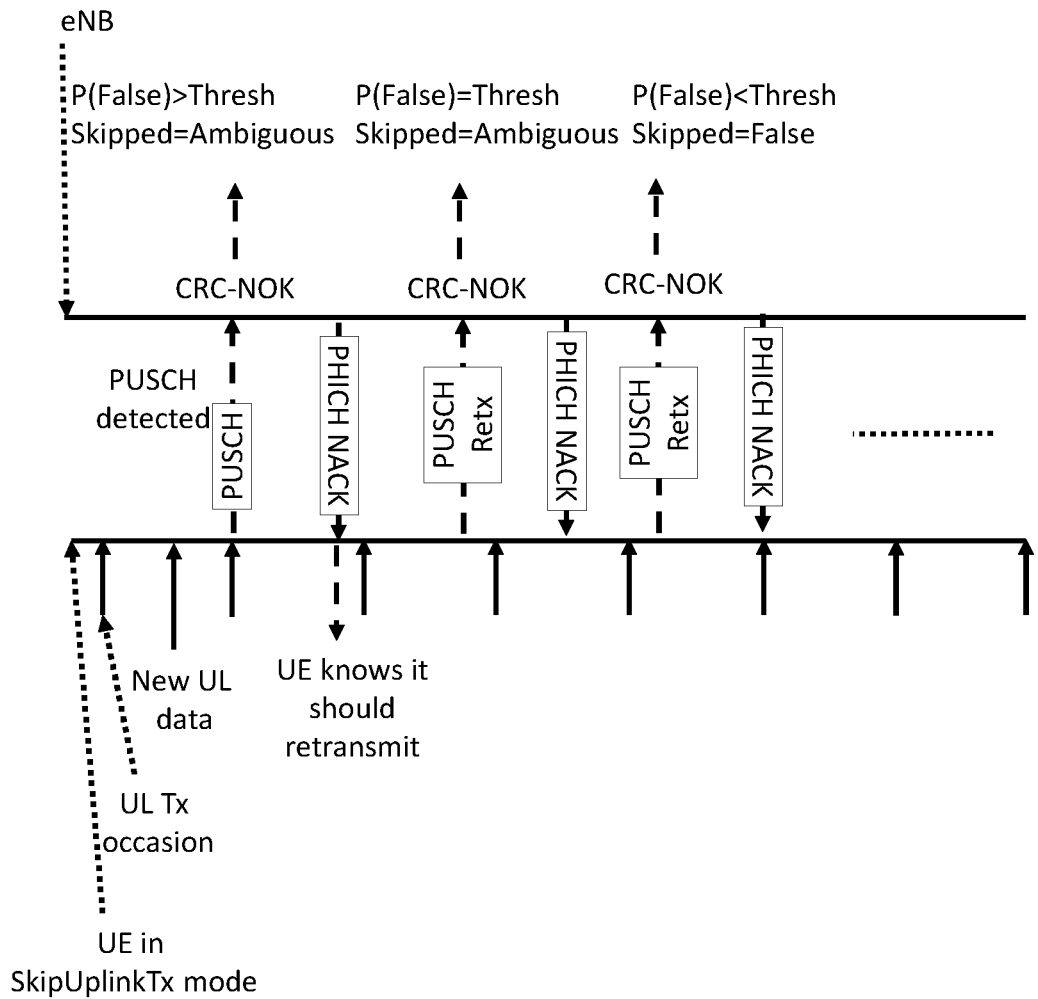
FIG. 7 shows example signaling between a network node and a UE when an uplink transmission is not skipped by the UE, according to an embodiment.

Operation in accordance with the method 400 is exemplified in FIGS. 6 and 7. FIG. 6 shows example signaling between the network node (such as a eNB) 510 and UE 520 when uplink transmission is skipped by the UE. In the present example, the probability of false PUSCH (i.e. DTX detected as PUSCH) is 1%, and the configurable SkipTx Decision Threshold employed at step 414 is 0.01%.

In the example on the left hand side of the line 601, the UE skips the uplink transmission, but the network node makes a false PUSCH detection. We then get CRC-NOK and the probability computed at step 413 is above the SkipTx Decision Threshold, so it remains uncertain at the network node whether or not the transmission was skipped. A PHICH NACK is then transmitted, but the UE ignores the PHICH since the UE didn't send any transmission. When the network node looks for the retransmission from the UE, it detects DTX, and concludes that that the uplink transmission was skipped.

In the example on the right hand side of the line 601, the UE also skips the uplink transmission, but the network node makes a two false PUSCH detections. After the second false PUSH detection, the probability computed at step 413 has dropped to the SkipTx Decision Threshold, but is still not below the threshold. It therefore remains uncertain at the UE whether or not the transmission was skipped. When the network node looks for the second retransmission from the UE, it detects DTX, and concludes that that the uplink transmission was skipped.

FIG. 7 shows example signaling between the network node (such as a eNB) 510 and UE 520 when uplink transmission is not skipped by the UE. In the present example, the probability of false PUSCH (i.e. DTX detected as PUSCH) is 1%, and the configurable SkipTx Decision Threshold employed at step 414 is 0.01%.

In this example, the UE has UL data to transmit, so it does not skip the uplink transmission. The network node makes a PUSCH detection, but gets CRC-NOK (for example due to interference). The probability computed at step 413 is above the SkipTx Decision Threshold, so it remains uncertain at the network node whether or not the transmission was skipped. A PHICH NACK is then transmitted. The UE knows it should retransmit, and does so. The network node makes a PUSCH detection for the retransmission, but gets CRC-NOK again. The probability computed at step 413 has dropped to the SkipTx Decision Threshold, but is still not below the threshold. It therefore remains uncertain at the UE whether or not the transmission was skipped. The network node makes a PUSCH detection for the next retransmission, but gets CRC-NOK yet again. The probability computed at step 413 has now dropped below the SkipTx Decision Threshold, so it can be concluded that the UE did not skip the uplink transmission. After this has been concluded, HARQ retransmission may continue until the network node is able to successfully decode the uplink transmission, or until a maximum number of HARQ attempts has been reached.

As illustrated by the examples shown in FIGS. 6-7, the method 400 in FIG. 4 may be employed to reduce the risk of falsely detecting a skipped uplink transmission at the UE from a probability of 1% down to below 0.01%. In other words, a more reliable detection of skipped UL transmissions is provided. A more reliable detection of skipped uplink transmissions may be employed to reduce scheduling of retransmissions, thereby freeing resources for other purposes.

As described above, unreliable detection of skipped uplink transmissions may affect link adaptation and/or UL HARQ BLER counters. By making detection of skipped uplink transmissions more reliable, performance of link adaptation and/or UL HARQ BLER counters may be improved.

In the method 400, an outer loop link adaptation adjustment and/or a BLER counter may for example be updated after step 406 and/or 415, when it has been concluded that the transmission has not been skipped. An outer loop link adaptation adjustment and/or a BLER counter may for example be updated also after step 411, when it has been concluded that the uplink transmission has been skipped. If it remains uncertain whether the uplink transmission has been skipped (so that the reason for failed decoding attempts is unknown), a normal update of the outer loop link adaptation adjustment and/or the BLER counter may for example be avoided. A normal update of the outer loop link adaptation adjustment and/or the BLER counter may for example be avoided if the maximum number of HARQ attempts has been reached at step 404 without having concluded whether or not the uplink transmission is skipped.

Figure 8:
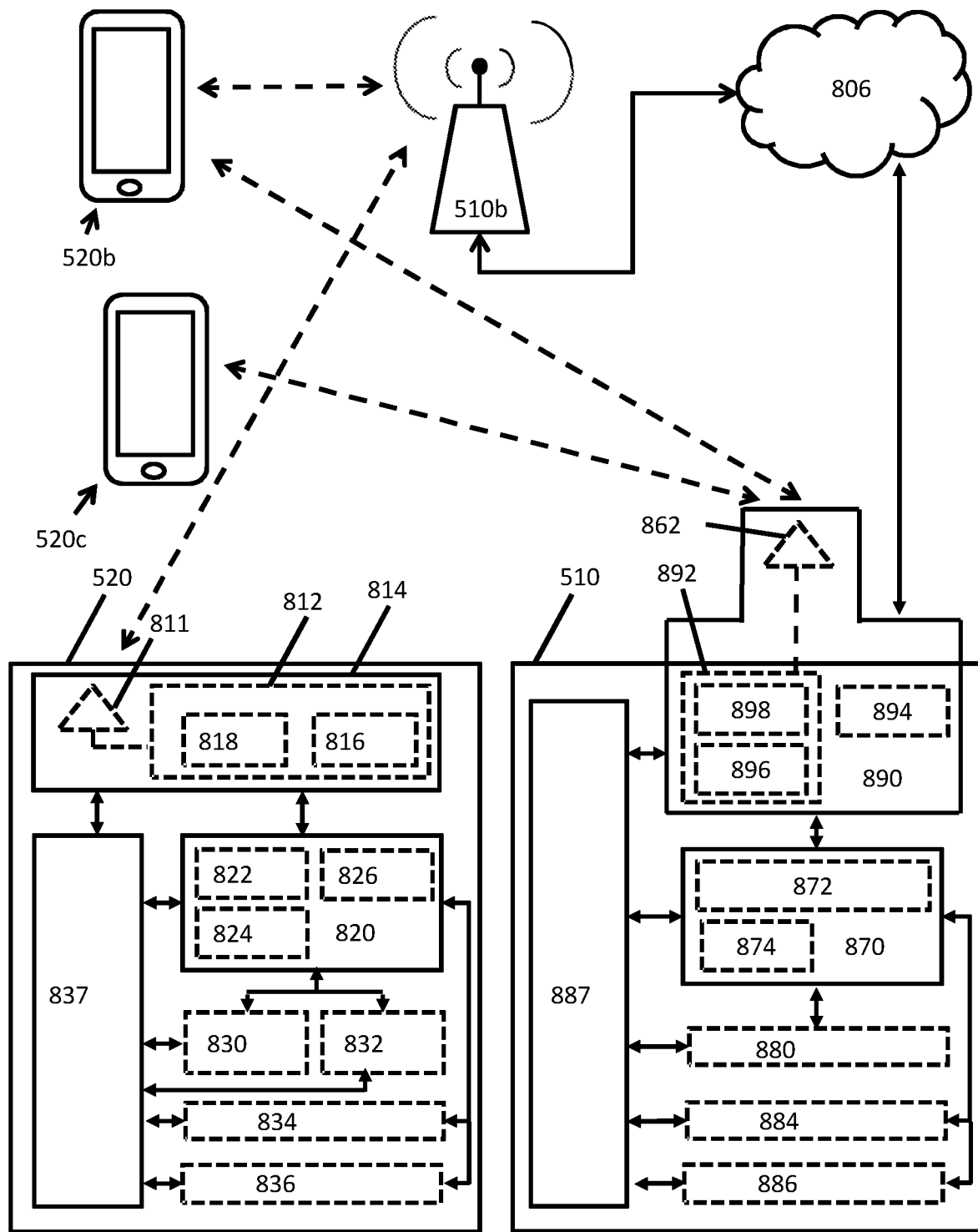
FIG. 8 shows a wireless network comprising a network node, in accordance with some embodiments.

The methods described above with reference to FIGS. 1-4 represent a first aspect of the present disclosure. FIG. 8 shows a wireless network, and will be further described in the next section. The network node 510 in FIG. 5 and the network nodes 510 and 510*b* described below with reference to FIG. 8 represent a second aspect of the present disclosure. The network node 510 (or the processing circuitry 870 of the network node 510) may for example be configured to perform the method of any of the embodiments of the first aspect described above. The network node 510 (or the processing circuitry 870 of the network node 510) may for example be configured to perform any of the methods 100, 200, 300 and 400 described above with reference to FIGS. 1-4.

According to an embodiment, the network node 510 may comprise processing circuitry 870 and at least one memory 880 (or a device-readable medium) containing instructions executable by the processing circuitry 870 whereby the network node 510 is operable to perform the method of any of the embodiments of the first aspect described above.

A non-transitory computer-readable medium, such as for example the device-readable medium 880, may store instructions which, when executed by a computer (or by processing circuitry such as 870), cause the computer (or the processing circuitry 870) to perform the method of any of the embodiments of the first aspect described above.

It will be appreciated that the network node 510 may for example comprise components and/or or processing circuitry operable to perform the operations of the DL transmitter 511, the UL receiver 512, and the scheduler 513 described above with reference to FIG. 5.

It will be appreciated that the network node 510 need not necessarily comprise all those components described below with reference to FIG. 8. For a network node 510 according to an embodiment of the second aspect, it is sufficient that the network node 510 comprises means for performing the steps of the method of the corresponding embodiment of the first aspect.

Similarly, it will be appreciated that the processing circuitry 870 need not necessarily comprise all those components described below with reference to FIG. 8.

It will be appreciated that a non-transitory computer-readable medium 880 may store instructions which, when executed by a computer (or by processing circuitry 870), cause the computer (or processing circuitry 870) to perform the method of any of the embodiments of the first aspect described above. It will also be appreciated that a non-transitory computer-readable medium 880 storing such instructions need not necessarily be comprised in a network node 510. On the contrary, such a non-transitory computer-readable medium could be provided on its own, for example at a location remote from the network node 510.

Overview of a Wireless Network and Parts Thereof

FIG. 8 shows a wireless network in accordance with some embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 510 and 510b, and WDs 520, 520b, and 520c (which may also be referred to as terminal devices or user equipment, UE). In practice, a wireless network may further include any additional elements suitable to support communication between wireless devices or between a wireless device and another communication device, such as a landline telephone, a service provider, or any other network node or end device. Of the illustrated components, network node 510 and wireless device (WD) 520 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 510 and WD 520 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 510 includes processing circuitry 870, device readable medium 880, interface 890, auxiliary equipment 884, power source 886, power circuitry 887, and antenna 862. Although network node 510 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 510 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 510 may be composed of multiple physically separate components (e.g., a NodeB component and a RNC component, or a BTS component and a BSC component, etc.), which may each have their own respective components. In certain scenarios in which network node 510 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 510 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 510 may also include multiple sets of the various illustrated components for different wireless technologies integrated into network node 510, such as, for example, GSM, WCDMA, LTE, NR, WiFi, or Bluetooth wireless technologies. These wireless technologies may be integrated into the same or different chip or set of chips and other components within network node 510.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 510 components, such as device readable medium 880, network node 510 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 510, but are enjoyed by network node 510 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 510. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 510, network 806, and/or WDs 520. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 510 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 510 and may be connectable to network node 510 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 510 with power for performing the functionality described herein. Power circuitry 887 may receive power from power source 886. Power source 886 and/or power circuitry 887 may be configured to provide power to the various components of network node 510 in a form suitable for the respective components (e.g., at a voltage and current level needed for each respective component). Power source 886 may either be included in or external to, power circuitry 887 and/or network node 510. For example, network node 510 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 510 may include additional components beyond those shown in FIG. 8 that may be responsible for providing certain aspects of the network node's functionality, including any of the functionality described herein and/or any functionality necessary to support the subject matter described herein. For example, network node 510 may include user interface equipment to allow input of information into network node 510 and to allow output of information from network node 510. This may allow a user to perform diagnostic, maintenance, repair, and other administrative functions for network node 510.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE) or terminal device. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 520 includes antenna 811, interface 814, processing circuitry 820, device readable medium 830, user interface equipment 832, auxiliary equipment 834, power source 836 and power circuitry 837. WD 520 may include multiple sets of one or more of the illustrated components for different wireless technologies supported by WD 520, such as, for example, GSM, WCDMA, LTE, NR, WiFi, WiMAX, or Bluetooth wireless technologies, just to mention a few. These wireless technologies may be integrated into the same or different chips or set of chips as other components within WD 520.

Antenna 811 may include one or more antennas or antenna arrays, configured to send and/or receive wireless signals, and is connected to interface 814. In certain alternative embodiments, antenna 811 may be separate from WD 520 and be connectable to WD 520 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 520 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 520 components, such as device readable medium 830, WD 520 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 520 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 520, but are enjoyed by WD 520 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 520, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 520. Such interaction may be of many forms, such as visual, audial, tactile, etc. User interface equipment 832 may be operable to produce output to the user and to allow the user to provide input to WD 520. The type of interaction may vary depending on the type of user interface equipment 832 installed in WD 520. For example, if WD 520 is a smart phone, the interaction may be via a touch screen; if WD 520 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 520, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 520, and to allow processing circuitry 820 to output information from WD 520. User interface equipment 832 may include, for example, a speaker, a display, vibrating circuitry, a USB port, a headphone interface, or other output circuitry. Using one or more input and output interfaces, devices, and circuits, of user interface equipment 832, WD 520 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 520 may further comprise power circuitry 837 for delivering power from power source 836 to the various parts of WD 520 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 520 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 520 to which power is supplied.

Miscellaneous

The person skilled in the art realizes that the proposed approach presented in the present disclosure is by no means limited to the preferred embodiments described above. On the contrary, many modifications and variations are possible. For example, the methods described above with reference to FIGS. 1-4 may be combined to form further embodiments. Further, it will be appreciated that the network node 510 shown in FIG. 8 is merely intended as an example, and that other network nodes may also perform the methods described above with reference to FIGS. 1-4.

It will be appreciated that the term radio access technology, or RAT, employed herein may refer to any RAT e.g. UTRA, E-UTRA, narrow band internet of things (NB-IoT), WiFi, Bluetooth, next generation RAT (NR), 4G, 5G, etc. The network nodes described herein may be capable of supporting a single or multiple RATs.

It will also be appreciated that the term time resource used herein may correspond to any type of physical resource or radio resource expressed in terms of length of time and/or frequency. Signals are transmitted or received by a radio node over a time resource. Examples of time resources are: symbol, time slot, subframe, radio frame, TTI, interleaving time, etc.

Additionally, variations to the disclosed embodiments can be understood and effected by those skilled in the art. It will be appreciated that the word "comprising" does not exclude other elements or steps, and that the indefinite article "a" or "an" does not exclude a plurality. The word "or" is not to be interpreted as an exclusive or (sometimes referred to as "XOR"). On the contrary, expressions such as "A or B" covers all the cases "A and not B", "B and not A" and "A and B". The mere fact that certain measures are recited in mutually different dependent embodiments does not indicate that a combination of these measures cannot be used to advantage.

ABBREVIATIONS

At least some of the following abbreviations are used in this disclosure.

| Abbreviation | Explanation |
| --- | --- |
| NR | Next Radio |
| LTE | Long term evolution |
| HARQ | Hybrid Automatic Repeat Request |
| DTX | Discontinuous Transmission |
| MAC | Medium Access Control |
| SPS | Semi-Persistent Scheduling |
| PUSCH | Physical Uplink Shared Channel |
| UPC | User Plane Control |
| SINR | Signal to Noise and Interference Ratio |
| TTI | Transmission Time Interval |

The invention claimed is:

1. A method of operating a network node, the method comprising:
   attempting to obtain a scheduled uplink transmission from a transmitter;
   in response to successful decoding at the network node of the scheduled uplink transmission, concluding that the uplink transmission is not skipped by the transmitter;
   in response to unsuccessful decoding at the network node of the scheduled uplink transmission and a signal strength measurement for the attempt to obtain the scheduled uplink transmission being below a threshold, concluding that the uplink transmission is skipped by the transmitter; and in response to unsuccessful decoding at the network node of the scheduled uplink transmission and the signal strength measurement for the attempt to obtain the scheduled uplink transmission exceeding the threshold, performing rescheduling of the uplink transmission wherein performing the rescheduling of the uplink transmission comprises:
  attempting to obtain an n:th rescheduled version of the uplink transmission for an n:th rescheduling of the uplink transmission, wherein n≥1; and
  in response to unsuccessful decoding at the network node of the n:th rescheduled version of the uplink transmission and a signal strength measurement for the attempt to obtain the n:th rescheduled version of the uplink transmission exceeding the threshold:
    checking whether a number n of times that the uplink transmission has been rescheduled has reached a threshold number; and
    in response to the threshold number having been reached, concluding that the uplink transmission is not skipped by the transmitter.

2. A network node comprising processing circuitry and at least one memory, the at least one memory containing instructions executable by the processing circuitry whereby the network node is operable to:
  attempt to obtain a scheduled uplink transmission from a transmitter;
  in response to successful decoding at the network node of the scheduled uplink transmission, conclude that the uplink transmission is not skipped by the transmitter;
  in response to unsuccessful decoding at the network node of the scheduled uplink transmission and a signal strength measurement for the attempt to obtain the scheduled uplink transmission being below a threshold, conclude that the uplink transmission is skipped by the transmitter; and
  in response to unsuccessful decoding at the network node of the scheduled uplink transmission and the signal strength measurement for the attempt to obtain the scheduled uplink transmission exceeding the threshold, perform rescheduling of the uplink transmission, wherein performing the rescheduling of the uplink transmission comprises:
    attempt to obtain an n:th rescheduled version of the uplink transmission for an n:th rescheduling of the uplink transmission, wherein n≥1; and
    in response to unsuccessful decoding at the network node of the n:th rescheduled version of the uplink transmission and a signal strength measurement for the attempt to obtain the n:th rescheduled version of the uplink transmission exceeding the threshold:
      check whether a number n of times that the uplink transmission has been rescheduled has reached a threshold number; and
      in response to the threshold number having been reached, conclude that the uplink transmission is not skipped by the transmitter.

3. The network node of claim 2, further configured to:
in response to unsuccessful decoding at the network node of the scheduled uplink transmission and the signal strength measurement for the attempt to obtain the scheduled uplink transmission exceeding the threshold:
attempt to obtain a rescheduled version of the uplink transmission from the transmitter;
  in response to successful decoding at the network node of the rescheduled version of the uplink transmission, conclude that the uplink transmission is not skipped by the transmitter; and
  in response to unsuccessful decoding at the network node of the rescheduled version of the uplink transmission and a signal strength measurement for the attempt to obtain the rescheduled version of the uplink transmission being below the threshold, conclude that the uplink transmission is skipped by the transmitter.

4. The network node of claim 2, further configured to:
in response to unsuccessful decoding at the network node of the scheduled uplink transmission and the signal strength measurement for the attempt to obtain the scheduled uplink transmission exceeding the threshold:
postpone, at least until an attempt to receive a rescheduled version of the uplink transmission, a conclusion regarding whether or not the uplink transmission is skipped by the transmitter.

5. The network node of claim 2, configured, for the n:th rescheduling of the uplink transmission, wherein n≥1, to:
  the attempt to obtain the n:th rescheduled version of the uplink transmission; and
  in response to unsuccessful decoding at the network node of the n:th rescheduled version of the uplink transmission and the signal strength measurement for the attempt to obtain the n:th rescheduled version of the uplink transmission exceeding the threshold, conclude that the uplink transmission is not skipped by the transmitter.

6. The network node of claim 5, configured to:
in response to successful decoding at the network node of the n:th rescheduled version of the uplink transmission, conclude that the uplink transmission is not skipped by the transmitter; and
in response to unsuccessful decoding at the network node of the n:th rescheduled version of the uplink transmission and the signal strength measurement for the attempt to obtain the n:th rescheduled version of the uplink transmission being below the threshold, conclude that the uplink transmission is skipped by the transmitter.

7. The network node of claim 2, further configured to:
in response to concluding that the uplink transmission is skipped by the transmitter, update:
  an outer loop link adaptation adjustment; and/or
  a block error rate, BLER, counter.

8. The network node of claim 2, further configured to:
in response to concluding that the uplink transmission is not skipped by the transmitter, update:
  an outer loop link adaptation adjustment; and/or
  a block error rate, BLER, counter.

9. The network node of claim 2, wherein the signal strength measurement is:
  a signal-to-interference-plus-noise ratio, SINR; or
  a signal power.

10. The network node of claim 2, wherein a determination regarding whether decoding at the network node of the scheduled uplink transmission is successful or unsuccessful is performed using:
  a cyclic redundancy check, CRC; and/or
  a parity check.

11. The network node of claim 2, further configured to:
in response to a conclusion whether or not the uplink transmission is skipped by the transmitter, signal the conclusion to a scheduler.

12. The network node of claim 2, further configured to: check whether skipping of uplink transmissions is enabled.

13. The network node of claim 2, wherein the uplink transmission is a PUSCH transmission.

14. A computer-readable storage medium having stored thereon a computer program comprising instructions which, when executed by a computer, cause the computer to:
- attempt to obtain a scheduled uplink transmission from a transmitter;
- in response to successful decoding at a network node of the scheduled uplink transmission, concluding that the uplink transmission is not skipped by the transmitter;
- in response to unsuccessful decoding at the network node of the scheduled uplink transmission and a signal strength measurement for the attempt to obtain the scheduled uplink transmission being below a threshold, concluding that the uplink transmission is skipped by the transmitter; and
- in response to unsuccessful decoding at the network node of the scheduled uplink transmission and the signal strength measurement for the attempt to obtain the scheduled uplink transmission exceeding the threshold, performing rescheduling of the uplink transmission, wherein performing the rescheduling of the uplink transmission comprises:
  - attempting to obtain an n:th rescheduled version of the uplink transmission for an n:th rescheduling of the uplink transmission, wherein n≥1; and
  - in response to unsuccessful decoding at the network node of the n:th rescheduled version of the uplink transmission and a signal strength measurement for the attempt to obtain the n:th rescheduled version of the uplink transmission exceeding the threshold:
    - checking whether a number n of times that the uplink transmission has been rescheduled has reached a threshold number; and
    - in response to the threshold number having been reached, concluding that the uplink transmission is not skipped by the transmitter.

15. A network node comprising processing circuitry and at least one memory, the at least one memory containing instructions executable by the processing circuitry whereby the network node is operable to:
- attempt to obtain a scheduled uplink transmission from a transmitter;
- in response to successful decoding at the network node of the scheduled uplink transmission, conclude that the uplink transmission is not skipped by the transmitter;
- in response to unsuccessful decoding at the network node of the scheduled uplink transmission and a signal strength measurement for the attempt to obtain the scheduled uplink transmission being below a threshold, conclude that the uplink transmission is skipped by the transmitter; and
- in response to unsuccessful decoding at the network node of the scheduled uplink transmission and the signal strength measurement for the attempt to obtain the scheduled uplink transmission exceeding the threshold, perform rescheduling of the uplink transmission, wherein performing the rescheduling of the uplink transmission comprises:
  - attempt to obtain an n:th rescheduled version of the uplink transmission, wherein n≥1;
  - in response to unsuccessful decoding at the network node of the n:th rescheduled version of the uplink transmission and a signal strength measurement for the attempt to obtain the n:th rescheduled version of the uplink transmission exceeding the threshold:
    - estimate a probability that the uplink transmission is skipped by the transmitter despite the signal strength measurement for the attempt to obtain the scheduled uplink transmission exceeding the threshold and despite, for each integer m in the range 1≤m≤n, a corresponding signal strength measurement for an attempt to obtain an m:th rescheduled version of the uplink transmission exceeding the threshold; and
    - in response to the estimated probability being below a second threshold, conclude that the uplink transmission is not skipped by the transmitter.

* * * * *